United States Patent
Brizmer et al.

(10) Patent No.: US 12,123,464 B2
(45) Date of Patent: Oct. 22, 2024

(54) BEARING COMPONENT AND METHOD OF MANUFACTURING THEREOF

(71) Applicant: AKTIEBOLAGET SKF, Gothenburg (SE)

(72) Inventors: Victor Brizmer, Utrecht (NL); Leonardo Catana, Chieri (IT); Urszula Alicja Sachadel-Solarek, Utrecht (NL); Mohamed Youssef Abdelraouf Sherif, Hilversum (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/457,495

(22) Filed: Dec. 3, 2021

(65) Prior Publication Data
US 2022/0196070 A1 Jun. 23, 2022

(30) Foreign Application Priority Data
Dec. 17, 2020 (IT) .......................... 102020000031232

(51) Int. Cl.
*B21D 53/10* (2006.01)
*F16C 33/62* (2006.01)

(52) U.S. Cl.
CPC .............. *F16C 33/62* (2013.01); *B21D 53/10* (2013.01); *F16C 2204/66* (2013.01); *F16C 2223/12* (2013.01)

(58) Field of Classification Search
CPC ............................ B21D 53/10; F16C 2223/12
See application file for complete search history.

(56) References Cited

U.S. PATENT DOCUMENTS

| | | | |
|---|---|---|---|
| 2,185,006 A | 12/1939 | Welch et al. | |
| 4,242,130 A | 12/1980 | Brandis et al. | |
| 2008/0145264 A1* | 6/2008 | Hetzner | C21D 5/00 148/612 |
| 2011/0052442 A1 | 3/2011 | Sherif | |
| 2012/0177527 A1 | 7/2012 | Kerrigan et al. | |
| 2015/0361533 A1 | 12/2015 | Sherif et al. | |

(Continued)

FOREIGN PATENT DOCUMENTS

| | | | | |
|---|---|---|---|---|
| WO | WO-2018095928 A1 * | 5/2018 | ................ | B22F 3/15 |
| WO | WO-2019203265 A1 * | 10/2019 | .............. | F16C 19/38 |
| WO | WO-2020161359 A1 * | 8/2020 | ........... | C22C 38/001 |

*Primary Examiner* — Christopher J. Besler
(74) *Attorney, Agent, or Firm* — J-TEK LAW PLLC; Jeffrey D. Tekanic; Scott T. Wakeman (57) ABSTRACT

A bearing component composed of a chromium-molybdenum-vanadium alloyed tool steel is produced by a process that includes: (i) performing a first preheating within a temperature range of 600-650° C., (ii) performing a second preheating within a temperature range of 850-900° C., (iii) austenitizing in vacuum at 1000-1180° C. for 20-40 min, (iv) gas quenching at a minimum of 4-5 bar overpressure, and (v) tempering by performing either a double temper at 520-560° C. for 1.5-2.5 hours in each temper, or a triple temper at 520-560° C. for 0.5-1.5 hours in each temper. The steel alloy may be composed (in mass percent) of 1.32-1.45 C, 0.32-0.50 Si, 0.26-0.48 Mn, 4.0-4.85 Cr, 3.35-3.55 Mo, 3.55-3.85 V, 0-0.13 W, 0-0.20 Ni, 0-0.15 Cu, 0-0.8 Co, 0-0.03 P, and 0-0.03 S, the balance being iron and unavoidable impurities. Mo may be replaced with W or vice versa in a replacement ratio Mo:W of 1:2.

20 Claims, 5 Drawing Sheets

(56) References Cited

U.S. PATENT DOCUMENTS

| | | |
|---|---|---|
| 2016/0047020 A1* | 2/2016 | Sherof .................... C22C 38/44 |
| | | 148/318 |
| 2016/0108960 A1 | 4/2016 | Morales Espejel et al. |
| 2016/0251744 A1 | 9/2016 | Huang et al. |
| 2016/0273587 A1 | 9/2016 | Beswick et al. |
| 2017/0233854 A1* | 8/2017 | Damm .................... C22C 38/24 |
| | | 420/101 |
| 2017/0306464 A1 | 10/2017 | Sherif et al. |
| 2017/0335440 A1 | 11/2017 | Sherif et al. |
| 2018/0073113 A1 | 3/2018 | Sherif et al. |
| 2018/0202030 A1 | 7/2018 | Sherif et al. |
| 2018/0223402 A1 | 8/2018 | Sherif et al. |
| 2020/0190638 A1* | 6/2020 | Hill ........................ C22C 38/22 |
| 2021/0025448 A1* | 1/2021 | Seko ........................ F16C 33/36 |

\* cited by examiner

BEARING COMPONENT AND METHOD OF MANUFACTURING THEREOF

CROSS-REFERENCE

The present application claims priority to Italian patent application serial no. 102020000031232 filed on Dec. 17, 2020, the contents of which are incorporated herein by reference in their entirety.

TECHNICAL FIELD

The present invention generally relates to bearing components and methods of manufacturing (in particular, heat treating) thereof.

BACKGROUND ART

In the field of machine tools, there is a strong demand for a high-performance steel solution for super-precision bearings utilized, e.g., in machining and milling spindles that operate under severe conditions. For example, in such applications, the contact pressure can reach 2.7 GPa at a rotation speed of 42000 rpm (2.5 M ndm or more, where "n" is the rotational speed in $min^{-1}$, and "dm" is the pitch circle diameter across the rolling elements in mm). Such bearings are typically angular contact ball bearings (ACBB) that are oil-air or grease lubricated. Further, the preload value must be optimized to achieve the required high rigidity during the spindle's operation over the entire range of speeds, and to prevent skidding. Such conditions pose a high risk of bearing seizure failure. Improving lubrication conditions in machining and milling spindle applications is complex. Therefore, efforts have been made to provide high performance steel solutions for such bearing rings.

One type of steel composition that is often used for such super-precision bearing applications is N360 ISOEXTRA (sold by voestalpine BÖHLER Edelstahl GmbH & Co KG of Kapfenberg Austria), which has a nominal composition in mass percent of 0.30 C, 0.60 Si, 0.40 Mn, 15.00 Cr, 1.00 Mo, and 0.40 Ni. However, because it is a stainless steel, it is not particularly well suited to coping with the risk of adhesive wear (seizure failure).

SUMMARY OF THE INVENTION

It is one non-limiting object of the present teachings to disclose techniques for improving steel materials, such as, e.g., a steel material, e.g., for use in a bearing component such as a bearing outer ring, a bearing inner ring or a rolling element, that has an improved composition and/or microstructure capable of reducing one or more of surface distress (micropitting), adhesive wear and/or abrasive wear, e.g., in high speed operations that may, e.g., suffer from poor lubrication conditions, and/or capable of increasing the resistance to contamination from solid particles.

In one aspect of the present teachings, the bearing component is formed from a steel alloy that is preferably a chromium-molybdenum-vanadium alloyed powder metallurgy tool steel that is, e.g., intended for cold forming operations.

For example, components (parts) manufactured according to the present teachings, e.g., bearing components, are preferably made from steel bars that had been manufactured by a powder metallurgy (P/M) process that includes coldpressing and sintering/hot-isostatic pressing (HIP) steps. Typically, such HIPed or consolidated steel bars are hot-forged and then machined to various diameters. Subsequently, the P/M-processed steel bar is forged, rolled, or turned into bearing components which are subjected to a heat treatment procedure, as will be further described below, that generates an advantageous microstructure, e.g., for super-precision bearing rings.

The steel powder, in this form, may also be utilized for additive manufacturing processes such as 3D-printing, for the purpose of manufacturing bearing components, where localized laser melting techniques are used, typically in a vacuum or argon atmosphere. This manufacturing technique usually requires substrate preheating to temperatures above that of room temperature, for example, 300° C. or above. The purpose of the preheating step is to manage thermal stresses that arise during processing, which if not controlled could lead to crack formation that damages the integrity of the printed metallic component.

The aforementioned process may also be used for the purpose of re-manufacturing (refurbishing) the raceways of a bearing by removing the damaged layer on the raceway by machining, then depositing a fresh metal layer on the machined raceway and subsequently finishing the fresh metal layer, e.g., by grinding and/or by hard turning.

In particular, a martensitic hardening heat treatment is preferably performed that results in a steel microstructure having a relatively high thermal conductivity as well as increased resistance to thermally induced softening (i.e. more tempering resistance). In addition, a high strain hardening capability is achieved by targeting (creating, generating) a larger difference in hardness and strength between matrix and second phases while the overall hardness of the mixture remains sufficiently high. Preferably, carbides are present in the steel microstructure in the width range of 0.4-3.4 μm.

In one non-limiting aspect of the present teachings, a cold-work P/M tool steel in the form of a bearing component, which is suitable, e.g., for reducing adhesive wear in service, may be subjected to the following martensitic heat treatment:

(i) performing a first preheating within a temperature range of 600-650° C.,
(ii) performing a second preheating within a temperature range of 850-900° C.,
(iii) austenitizing in vacuum at 1000-1180° C., preferably 1100-1150° C., for 15-30 minutes (the preferred range ensures maximum wear resistance, but lower austenitizing temperature ranges (e.g., as low as 1000° C.) may be utilized in case higher toughness is required for a particular application of the present teachings),
(iv) gas quenching at a minimum of a 4-5 bar overpressure, and
(v) tempering by performing either a double temper at 520-560° C., e.g., 540-560° C. for 1-3 hours, e.g., 1.5-2.5 hours, in each temper, or a triple temper at 520-560° C., e.g., 540-560° C., for 0.5-2.5 hours, e.g., 0.75-1.5 hours, per temper.

Each of the above-noted method steps may be performed under varying conditions that still result in an improved microstructure in accordance with the present teachings.

Optionally, deep freezing may be performed between tempering steps, in which case the deep freezing is preferably followed by tempering of the newly formed un-tempered martensite. In other words, one or more deep freezing steps can be accommodated in between tempering steps. For example, if austenitizing is performed at greater than 1150° C., e.g., at 1180° C., sub-zero treatment may then be required, e.g., in the range of −70 to −80° C. for 0.5-2 hours at temperature, depending on the treated component wall thickness.

After tempering, the bearing component preferably exhibits one or more of the following microstructure features:

retained austenite 0-1.5 vol. %, more preferably 0-1.0 vol. %, even more preferably undetectable by X-ray diffraction, and/or cementite 1.0-3.0 vol. %, more preferably 1.8-2.5 vol. %, and/or Mo2C (Mo-rich M2C-type carbide) orthorhombic 0.5-2.5 vol. %, more preferably 1.2-1.6 vol. %, and/or Iron-alpha (tempered martensite matrix, typically body-centered tetragonal (BCT)) 80-95 vol. %, more preferably 83-93 vol. %, and/or VC (essentially vanadium-rich carbide) 3-13 vol. %, more preferably 3.5-12 vol. %.

In case the steel alloy contains less than or equal to 4 mass % V, iron-alpha (matrix) is preferably 89-94 vol. %, more preferably 90-93 vol. %, and VC is preferably 3-5 vol. %, more preferably 3.5-4.5 vol. %. On the other hand, in case the steel alloy contains more than 4 mass % V, iron-alpha (matrix) is preferably 81-86 vol. %, more preferably 83-85 vol. %, and VC is preferably 9-14 vol. %, more preferably 10-12.5 vol. %.

In one aspect of the present teachings, the steel alloy has a composition that comprises (in mass percent) 1.25-1.55 C (carbon), 0.28-0.90 Si (silicon), 0.22-0.54 Mn (manganese), 4.0-5.10 Cr (chromium), 2.80-3.65 Mo (molybdenum) and 3.45-4.0 V (vanadium), a majority of the steel composition being iron. Preferably, the steel alloy has a composition composed (in mass percent) of 1.32-1.45 C, 0.32-0.48 Si, 0.26-0.48 Mn, 4.3-4.85 Cr, 3.35-3.55 Mo and 3.55-3.85 V, optionally containing 0-0.13 W, 0-0.20 Ni, 0-0.15 Cu, 0-0.8 Co, 0-0.03 P, and 0.03 S, the balance being iron and unavoidable impurities. In the alternative, the steel alloy has a composition composed (in mass percent) of 1.3-1.45 C, 0.7-0.9 Si, 0.3-0.5 Mn, 4.85-5.2 Cr, 2.8-3.2 Mo and 3.7-4.0 V, optionally containing 0-0.1 W, 0-0.18 Ni, 0-0.12 Cu, 0-0.8 Co, 0-0.025 P, and 0-0.028 S, the balance being iron and unavoidable impurities.

The steel alloy may have a composition composed (in mass percent) of 1.4 C, 0.4 Si, 0.4 Mn, 4.6 Cr, 3.5 Mo and 3.7 V, optionally containing 0-0.1 W, 0-0.18 Ni, 0-0.12 Cu, 0-0.025 P, and 0-0.028 S, the balance being iron and unavoidable impurities. Even more preferably, the steel alloy has a composition composed (in mass percent) of 1.40 C, 0.40 Si, 0.40 Mn, 4.70 Cr, 3.50 Mo and 3.70 V, optionally containing 0-0.1 W, 0-0.18 Ni, 0-0.12 Cu, 0-0.025 P, and 0-0.028 S, the balance being iron and unavoidable impurities. In the alternative, the steel alloy may have a composition composed (in mass percent) of 1.35 C, 0.8 Si, 0.40 Mn, 5.0 Cr, 2.95 Mo and 3.85 V, optionally containing 0-0.1 W, 0-0.18 Ni, 0-0.12 Cu, 0-0.025 P, and 0-0.028 S, the balance being iron and unavoidable impurities.

In another aspect of the present teachings, the steel alloy has a composition composed (in mass percent) of 2.1-2.5 C, 0.3-0.5 Si, 0.3-0.4 Mn, 4.55-5.10 Cr, 3.35-3.85 Mo and 7.6-8.2 V, optionally containing 0-0.1 W, 0-0.2 Ni, 0-0.12 Cu, 0-0.8 Co, 0-0.025 P, and 0-0.028 S, the balance being iron and unavoidable impurities. Preferably, the steel alloy has a composition composed (in mass percent) of 2.2-2.4 C, 0.3-0.5 Si, 0.3-0.4 Mn, 4.65-4.95 Cr, 3.45-3.75 Mo and 7.6-8.1 V, optionally containing 0-0.1 W, 0-0.2 Ni, 0-0.12 Cu, 0-0.8 Co, 0-0.025 P, and 0-0.028 S, the balance being iron and unavoidable impurities.

The steel alloy may have a composition composed (in mass percent) of 2.3 C, 0.4 Si, 0.4 Mn, 4.8 Cr, 3.6 Mo and 8.0 V, optionally containing 0-0.1 W, 0-0.12 Cu, 0-0.025 P, and 0-0.028 S, the balance being iron and unavoidable impurities. Optionally, the steel alloy may have a composition composed (in mass percent) of 2.30 C, 0.40 Si, 0.40 Mn, 4.80 Cr, 3.60 Mo and 8.00 V, optionally containing 0-0.1 W, 0-0.12 Cu, 0-0.025 P, and 0-0.028 S, the balance being iron and unavoidable impurities.

In any of the above-described steel alloys or below-described steel alloys, tungsten may be replaced, at least substantially or entirely, with molybdenum and/or molybdenum may be replaced, at least substantially or entirely, with tungsten. For example, the replacement ratio Mo/W may be 1:2 in any of the above- or below-described steel alloys. That is, e.g., 1 wt % Mo can be replaced with 2 wt % W or vice versa.

Additional objects, aspects, embodiments and advantages of the present teachings will be become apparent after reading the following detailed description in conjunction with the appended claims and Figures.

DETAILED DESCRIPTION OF THE PREFERRED EMBODIMENTS

Preferable ranges for the alloying elements of the steel alloys according to the present teachings are described below.

In one embodiment of the present teachings, carbon is preferably present in the steel alloy in a mass percentage having a lower limit of greater than or equal to 1.25, greater than or equal to 1.3, or greater than or equal to 1.32, and an upper limit of less than or equal to 1.55, less than or equal to 1.45, or less than or equal to 1.42 or in any range obtained by combining any of the preceding lower and upper limits without restriction and in any combination thereof.

In another embodiment of the present teachings, carbon is preferably present in the steel alloy in a mass percentage having a lower limit of greater than or equal to 2.1, greater than or equal to 2.2, or greater than or equal to 2.25, and an upper limit of less than or equal to 2.5, less than or equal to 2.4, or less than or equal to 2.35 or in any range obtained by combining any of the preceding lower and upper limits without restriction and in any combination thereof.

Silicon is preferably present in the steel alloy in a mass percentage having a lower limit of greater than or equal to 0.28, greater than or equal to 0.3, or greater than or equal to 0.32, and an upper limit of less than or equal to 0.9, less than or equal to 0.6, less than or equal to 0.5, less than or equal to 0.48, or less than or equal to 0.43 or in any range obtained by combining any of the preceding lower and upper limits without restriction and in any combination thereof. In alternate embodiment of the present teachings, silicon is preferably present in the steel alloy in a mass percentage having a lower limit of greater than or equal to 0.7, greater than or equal to 0.74, or greater than or equal to 0.78, and an upper limit of less than or equal to 0.9, less than or equal to 0.86, or less than or equal to 0.82 or in any range obtained by combining any of the preceding lower and upper limits without restriction and in any combination thereof.

Manganese is preferably present in the steel alloy in a mass percentage having a lower limit of greater than or equal to 0.22, greater than or equal to 0.26, or greater than or equal to 0.3, and an upper limit of less than or equal to 0.54, less than or equal to 0.5, or less than or equal to 0.48 or in any range obtained by combining any of the preceding lower and upper limits without restriction and in any combination thereof.

Chromium is preferably present in the steel alloy in a mass percentage having a lower limit of greater than or equal to 4.0, greater than or equal to 4.3, greater than or equal to 4.55, greater than or equal to 4.6, greater than or equal to 4.65, or greater than or equal to 4.85, and an upper limit of less than or equal to 5.20, less than or equal to 5.10, or less than or equal to 4.95 or in any range obtained by combining any of the preceding lower and upper limits without restriction and in any combination thereof.

Molybdenum is preferably present in the steel alloy in a mass percentage having a lower limit of greater than or equal to 2.80, greater than or equal to 3.35, or greater than or equal to 3.45, and an upper limit of less than or equal to 3.85, less than or equal to 3.75, less than or equal to 3.65, or less than or equal to 3.2 or in any range obtained by combining any of the preceding lower and upper limits without restriction and in any combination thereof. As was mentioned above, molybdenum may be replaced, at least substantially or entirely, with tungsten. For example, the replacement ratio Mo/W may be 1:2 in any of the above- or below-described steel alloys.

In another embodiment of the present teachings, vanadium is preferably present in the steel alloy in a mass percentage having a lower limit of greater than or equal to 3.45, greater than or equal to 3.55, or greater than or equal to 3.7, and an upper limit of less than or equal to 4.0, less than or equal to 3.95, or less than or equal to 3.9 or in any range obtained by combining any of the preceding lower and upper limits without restriction and in any combination thereof.

In alternate embodiment of the present teachings, vanadium is preferably present in the steel alloy in a mass percentage having a lower limit of greater than or equal to 4.6, greater than or equal to 7.8, greater than or equal to 7.85, or greater than or equal to 7.9, and an upper limit of less than or equal to 8.2, less than or equal to 8.15, or less than or equal to 8.1 or in any range obtained by combining any of the preceding lower and upper limits without restriction and in any combination thereof.

In some embodiments of the present teachings, tungsten may be present in a range of, e.g., 0-0.13 mass percent. However, in other embodiments, tungsten may be added in a range of 1.5-3.5 mass percent. As was mentioned above, tungsten may be replaced, at least substantially or entirely, with molybdenum, and vice vera. For example, the replacement ratio Mo/W may be 1:2 in any of the above- or below-described steel alloys.

Nickel may be present in a range of, e.g., 0-0.20 mass percent.

Copper may be present in a range of, e.g., 0-0.14 mass percent.

Phosphorus may be present in a range of, e.g., 0-0.03 mass percent.

Sulphur may be present in a range of, e.g., 0-0.03 mass percent.

Cobalt may be present in a range of, e.g., 0-0.8 mass percent, more preferably 0-0.2 mass percent.

Unavoidable impurities may be present in a range of, e.g., 0-0.5 mass percent, preferably 0-0.3 mass percent, more preferably 0-0.2 mass percent, even more preferably 0-0.1 mass percent.

Experimental Results

Working examples of steel alloys according to the present teachings and a representative manufacturing method thereof are explained below in conjunction with comparative examples. It is noted that the steel alloys, bearing components and manufacturing methods according to the present invention are not limited to the specifics of the working examples, and the compositions and steps thereof can be modified as appropriate within a range that does not depart from the gist thereof.

1. Materials and Methods

Bars having the steel alloy compositions described in Table 1 below were utilized in the following procedures. Steel Alloys A-D and G-H were prepared according to a powder metallurgical (P/M) process.

TABLE 1

| Alloy | C | Si | Mn | P | S | Cr | Mo | W | V | Co | Ni | Cu | Al | N | $O_2$ (ppm) |
|---|---|---|---|---|---|---|---|---|---|---|---|---|---|---|---|
| A | 1.35 | 0.38 | 0.32 | 0.021 | 0.017 | 4.53 | 3.47 | 0.05 | 3.60 |  | 0.16 | 0.10 |  |  |  |
| B | 1.39 | 0.40 | 0.31 | 0.020 | 0.026 | 4.52 | 3.46 | 0.09 | 3.63 |  | 0.15 | 0.11 |  |  |  |
| C | 2.30 | 0.45 | 0.34 | 0.021 | 0.017 | 4.72 | 3.63 | 0.05 | 8.01 |  |  | 0.11 |  |  |  |
| D | 2.28 | 0.37 | 0.37 | 0.023 | 0.021 | 4.73 | 3.68 | 0.05 | 7.77 |  |  | 0.11 |  |  |  |
| E | 0.72 | 0.18 | 0.49 | 0.008 | 0.0004 | 5.06 | 2.37 |  | 0.50 |  |  |  |  |  |  |
| F | 0.72 | 0.16 | 0.49 | 0.008 | 0.0004 | 5.07 | 2.35 |  | 0.50 |  |  |  |  |  |  |
| G | 1.29 | 0.64 | 0.25 | 0.02 | 0.014 | 3.88 | 4.82 | 6.07 | 3.03 | 0.65 |  |  |  |  |  |
| H | 1.28 | 0.39 | 0.32 | 0.029 | 0.008 | 3.7 | 10.40 | 5.98 | 1.99 | 0.77 | 0.145 |  |  |  |  |
| I | 0.94 | 0.29 | 0.41 | 0.012 | 0.004 | 1.47 | 0.03 |  |  |  |  | 0.04 | 0.009 |  | 10 |
| J | 0.30 | 0.54 | 0.36 | 0.016 | 0.0003 | 15.10 | 0.98 |  |  |  | 0.15 |  |  | 0.38 |  |
| K | 0.31 | 0.57 | 0.33 | 0.017 | 0.0006 | 15.13 | 1.02 |  |  |  | 0.14 |  |  | 0.40 |  |

All of the above-noted steel alloys were provided in a spheroidise-annealed state. The following hardening heat treatments were utilized for the different steel alloys. However, in summary, all of the steel alloys were quenched and tempered, whereby the microstructure featured a tempered martensite matrix with some retained austenite, and depending on, primarily the alloy chemistry, various types of carbides, carbonitrides and nitrides.

More specifically, the following heat treatments were utilized for the steel alloys as described in Table 2 below:

TABLE 2

| Alloy | Preheat 1 | Preheat 2 | Vacuum hardening (austenitizing) | Gas quenching | Tempering |
|---|---|---|---|---|---|
| A, B | 600-650° C. | 850-900° C. | 1100 ± 20° C. 20-40 min. | Minimum 4-5 bar overpressure with high fan speed | 530-560° C./2 times for 2 hours each time, alternatively, |
| C, D | 600-650° C. | 850-900° C. | 1100-1185° C. 15-40 min. | Minimum 4-5 bar overpressure with high fan speed | 530-560° C./3 times for 1 hour each time |
| E, F | 600-650° C. | 850-900° C. | 1030 ± 20° C. 20-40 min. | Minimum 4-5 bar overpressure with high fan speed | 540 ± 20° C./3 times for 1 hour each time |
| G | 450-500° C. | 850-900° C. | 1120 ± 30° C. 5-15 min. | Minimum 4-5 bar overpressure with high fan speed | 560 ± 30° C./3 times for 1 hour each time |
| H | 450-500° C. | 850-900° C. | 1170-1200° C. | — | 560 ± 20° C./4 times for 1 hour each time |
| I | Not critical | Not critical | 850-870° C. 20-40 min. | Oil quenching at 80-90° C. with 10 minute soak | 200-220° C./for 4 hours |
| J, K | 600-650° C. | 700-760° C. | 1010 + 30° C. | Minimum 6 bar overpressure | 170-200° C./2 times for 2 hours each time. Subzero cooling treatment applied after each tempering. |

X-ray diffraction analysis was performed on the quenched and tempered samples using a Bruker D8 DISCOVER diffractometer, operated at 50 kV and 50 mA using Zr-filtered Mo $K_{\alpha 1,2}$ radiation. A step-scan mode, θ:θ scan, was employed over the scanned 2θ range of 15° to 63°. The angular step width was 0.02° with a collecting time of 10 s at each step. The results were analyzed according to the Rietveld refinement method using TOPAS (version 5) software obtained from Bruker Corporation of Billerica, Massachusetts, and the microstructure information is provided in Table 3 below. All values are average volume percentages, in which at least two samples were analyzed for each group of alloys.

with rolling/sliding rough contacts under poor lubrication condition, corresponding to high surface tractions. Under the microscope, the affected surface areas show the presence of tiny micro-spalls, micro-pits or micro-cracks (perpendicular to the direction of rolling and sliding) with a typical size of a few tens of microns and a few microns in depth. Surface distress can be particularly detrimental to the bearing function. Although it is not a primary failure mode for rolling bearings, it can facilitate or accelerate the appearance of other, more severe failure modes, such as surface-initiated spalling.

To assess micropitting, a micropitting rig was used, in which three identical diameter washers (made of Alloy I) were disposed such that the rotational axes thereof were disposed on vertices of an equilateral triangle. Two of the

TABLE 3

| | Alloys A, B | Alloys C, D | Alloys E, F | Alloy G | Alloy H | Alloy I | Alloys J, K |
|---|---|---|---|---|---|---|---|
| Austenite | 0.6 +/− 0.0 | 0.7 +/− 0.0 | 1.5 +/− 0.0 | 0.9 +/− 0.1 | 2.2 +/− 0.5 | 6.4 +/− 0.1 | 1.8 +/− 0.1 |
| Cementite | 2.0 +/− 0.0 | 2.2 +/− 0.1 | | 2.3 +/− 0.3 | | 7.4 +/− 0.1 | |
| Fe2Mo4C (M6C) | | | 0.8 +/− 0.1 | 10.1 +/− 0.5 | 9.4 +/− 0.1 | | |
| Iron-alpha (matrix)* | 91.8 +/− 0.1 | 84.1 +/− 0.2 | 97.6 +/− 0.1 | 82.9 +/− 0.4 | 75.9 +/− 0.4 | 86.2 +/− 0.0 | 76.8 +/− 0.6 |
| Mo2C hexagonal | 0.1 +/− 0.0 | 0.1 +/− 0.0 | | 0.2 +/− 0.0 | 0.4 +/− 0.1 | | 0.1 +/− 0.0 |
| VC | 4.1 +/− 0.1 | 11.5 +/− 0.2 | | 3.6 +/− 0.3 | 4.3 +/− 0.1 | | |
| Fe3W3C (M6C) | | | | | 7.7 +/− 0.3 | | |
| Mo2C orthorhombic | 1.4 +/− 0.0 | 1.4 +/− 0.1 | | | | | |
| Cr2N | | | | | | | 1.1 +/− 0.2 |
| Cr7C3 | | | | | | | 20.2 +/− 0.4 |

*For the purpose of carrying out the Rietveld refinement of a full diffraction pattern, the matrix phase was considered to be iron-alpha in terms of its crystal structure, although it is a tempered martensite matrix, typically body-centered tetragonal.

Three types of screening tests were designed and performed on the quenched and tempered alloys to evaluate the resistance of these heat treated steel alloys to three different surface damage modes that are common in super-precision bearing applications, namely: surface distress (micropitting), adhesive wear, and abrasive wear. These tests are described sequentially in the following sections.

A. Surface Distress

Surface distress is also known as micropitting (due to the surface micro-cracks or micro-pits that are observed) and is a surface-initiated fatigue at the asperity level associated washers were partially immersed in oil (lubricant) and the third washers applied a load on a roller sample (formed from the above-noted quenched and tempered steel alloys) that was disposed between the three washers so as to be in contact with all three washers. Each roller sample had a diameter of 12 millimeters. The roller and washers were driven by two independent motors, to enable the slide-to-roll ratio to be controlled within its full range (from pure rolling to pure sliding).

The micropitting rig was operated according to the conditions shown in Table 4 below.

TABLE 4

| Parameter | Value |
| --- | --- |
| Washer r.m.s. roughness, Rq | ≤50 nm |
| Washers r.m.s. roughness, Rq | 500 ± 50 nm |
| Washers roughness orientation | Transverse |
| Maximum contact pressure, p0 | 2 GPa |
| Lubricant | T32 mineral base oil |
| Temperature, T | 40° C. |
| Slide-to-roll ratio, S | 0.02 |
| Lubrication quality parameter, Λ | 0.3 |
| Lubricant entrainment speed, U | 1 m/s |
| Number of loading cycles, N | 720 kCyc |
| Total testing time | 2.5 hours |

After each test, the roller sample was dismounted, properly cleaned to remove lubricant residue, and its final weight was measured to obtain the weight loss caused by the combined action of surface distress and (unavoidable) mild wear. Then, five to ten optical images of the roller's surface were taken to capture the entire contact track at different circumferential locations. The pictures were visually analyzed by comparing the surface appearance against a standard scale of surface distress performance. The test final results included the average grade of surface distress resistance (from 1 (i.e. unacceptable) to 5 (i.e. excellent), rounded to 0.5) and the weight loss (in mg).

B. Adhesive Wear

Adhesive wear is a type of lubricant-related damage that occurs between two mating surfaces sliding relative to each other. It is characterized by the transfer of material from one surface to another (smearing or scuffing). It is typically accompanied by frictional heat, which can sometimes temper or reharden the mating surfaces. The relative sliding speed must be higher than the slip induced by the bearing geometry in the rolling contact area.

In bearings, adhesive wear can occur on the surface of the rolling elements and raceways of rolling bearings operating at relatively high speeds. Outside the loaded zone, the rolling element rotation is retarded because the rolling elements are not driven. When they enter the loaded zone, the rolling elements are subjected to a rapid acceleration. This can cause sliding (or even skidding, i.e. gross sliding of rolling elements on raceways) that can generate enough heat to melt together the two surfaces at the points of metal-to-metal contact. This welding process causes material to be transferred from one surface to the other, which also leads to higher friction. In super precision bearings, this will normally not occur as they are mainly axially loaded. Thus, the main sliding mechanisms in super precision bearings are typically ball spinning and micro-sliding, which become important due to the very high speeds commonly utilized with these kind of bearings.

A WAM (Wedeven Associates Machine) ball-on-disc (ball-on-washer) machine was utilized to determine adhesive wear, because it is a versatile rig that can be utilized in a wide range of test conditions. Because the ball and disc (washer) can be controlled in a fully independent manner and high loads can be applied (leading to a contact pressure up to 2.8 GPa), it is a suitable machine to use for adhesive wear tests, where high loads and high sliding speeds are required.

In order to have a constant film thickness, the lubricant entrainment speed (the speed that defines the lubricant film thickness in the contact and equals the average linear speed of the two contacting surfaces) is kept constant while the sliding speed (i.e. the difference between the speeds of the surfaces) is increased continuously until surface adhesive wear occurs. This is characterized by a sharp increase in the traction coefficient, usually accompanied by a distinct noise. The entraining speed is chosen such that the test is run in boundary lubrication conditions (Lambda equals 0.2). This is valid at the start of the test; due to frictional heating, the temperature of the test components will rise, which will reduce the viscosity of the lubricant which in turn will reduce the film thickness in (at) the contact.

In order to test the above-described quenched and tempered materials, washers of the above steel alloys were manufactured according to the following specifications: thickness 4.75 mm, outer diameter 85 mm, inner (hole) diameter 60 mm.

The washers were fixed on a support disc that was mounted onto the WAM disc spindle. Each washer surface was circular ground to a roughness value Rq=0.5 μm. The ball was a ceramic ball (RB-20,638 H13/G10 Si3N4 TSN-03NH). For each test, a new washer track was used; each ball was used twice. The lubricant was Shell Turbo T32, which is a mineral turbine oil without extreme pressure additives or anti-wear additives. The test conditions are identified in Table 5 below.

TABLE 5

| Parameter | Value |
| --- | --- |
| Ball roughness, Rq | ~5 nm |
| Washer roughness, Rq | 500 ± 50 nm |
| Washer roughness orientation | Circular |
| Applied Load | 100N, 300N, 600N |
| Lubricant | Shell Turbo T32 |
| Temperature, T | 60° C. |
| Slide-to-roll ratio (SSR) | 0 to 15 |
| Lubrication quality parameter, Λ | 0.2 |
| Lubricant entrainment speed, U | 1 m/s |

The test was performed using three different loads (100 N, 300 B and 600 N), which resulted in the respective contact pressures of 1.5, 2.2 and 2.8 GPa. These contact pressures may vary somewhat during the test due to the different elasticity moduli of the different steel alloys.

The first test was performed at a load of 300 N. If adhesive wear occurred fast (at a low sliding speed), 100 N was applied in the next test after which both loads are repeated. Finally, one test was performed at 600 N. In case adhesive wear at 300 N occurred at a high sliding speed, the next test was run at 600 N and only the final test was run at 100 N load. In this way, the available test tracks on the washer were used most efficiently.

Optical observations were performed on the balls and washers after being properly cleaned, in order to verify that adhesive wear had actually occurred. The test results were then plotted on a map showing the loads or their corresponding contact pressures plotted against the sliding speed at which adhesive wear occurred. The points in the scuffing map can be connected with a line. The area to the left side of this line is the safe area where no adhesive wear occurs, whereas the area to the right side of the line is the unsafe area where adhesive wear is expected.

C. Abrasive Wear

Abrasive wear tests were performed to determine the wear resistance of materials during sliding. In particular, a pin-on-washer wear test was performed, which required a pin specimen and a washer specimen. A ball, which is rigidly held, was used as the pin specimen. The ball was pressed against the washer at a constant load. The test machine caused the washer to revolve about the washer center, at a specified sliding speed and under well-controlled lubrication conditions. The sliding path was a circle on the washer surface. After a certain sliding distance, the amount of wear was determined by measuring the weight loss (in mg) of the washer.

The pin-on-washer apparatus was constructed in accordance with the ASTM G99 standard. Two types of balls, namely steel balls and alumina balls, were used to wear the washers made from above-described quenched and tempered steel alloys.

The alumina ($Al_2O_3$) balls were 9.5 mm in diameter, provided by Shanghai Unite Technology Co., Ltd. The ceramic balls were sintered only, without further rough lapping, semi finish lapping and finish lapping. The roughness was therefore Ra (mean)≈2 μm. The ceramic ball specimens had a microstructure composed of equigranular alpha alumina with minor secondary phases, a hardness greater than or equal to 1600 HV3, a Young's Modulus of 350 GPa, a Poisson ratio of 0.29 and roughnesses as follows: $R_a$ mean 2721.3 nm, $R_z$ mean 26.46 μm. The ball was held down stationary on the washer under a 100 N load, yielding a ceramic-steel maximum contact pressure of about 2.6 GPa.

Prior to hardening and tempering, the above-described steel alloys were formed into washer specimens having the above-described specifications, namely: thickness 4.75 mm, outer diameter 85 mm, inner (hole) diameter 60 mm. Then, the washer specimens were heat treated (hardened) and tempered according to the heat treatments described above. Thereafter, the washer specimens were ground to a high finish. After grinding, the washer specimens exhibited the characteristics shown in Table 6 below:

TABLE 6

| Alloy | Hardness HV10 | Roughness $R_a$ mean in nm | Roughness $R_z$ mean in μm |
| --- | --- | --- | --- |
| A, B | 767 ± 1 | 7.5 | 0.198 |
| C, D | 756 ± 2 | — | — |
| E, F | 704 ± 2 | 8.4 | 0.298 |
| G | 816 ± 1 | — | — |
| H | 923 ± 8 | 12.6 | 0.167 |
| I | 728 ± 3 | — | — |
| J, K | 685 ± 2 | 7.4 | 0.195 |

During the wear tests, each washer specimen was immersed in Shell Turbine T32 oil at room temperature. In order to minimize the influence of debris in (at) the contact, the oil was changed after each test. The washer was rotated at a speed of 0.19 m/s, which was slow enough to avoid temperature increases caused by sliding. The weight of the washers was measured before and after a sliding distance of 3 kilometers.

2. Results & Discussion

A. Surface Distress

The results of the micropitting rig surface distress test are shown in Table 7 below:

TABLE 7

| | A, B | C, D | E, F | G | H | I | J, K |
| --- | --- | --- | --- | --- | --- | --- | --- |
| Average surface distress resistance | 5 | 5 | 1 | 4 | 4.5 | 3 | 3 |
| Average roller weight loss, in mg | 0.27 | 0.07 | 0.80 | 0.18 | 0.20 | 0.29 | 0.72 |

Table 7 shows average values of 3 to 4 tests per steel variant, except E, F for which only one MPR test was performed, of surface distress resistance and roller weight loss.

Steel Alloys A, B, C and D exhibited superior surface distress resistance. Alloys C and D also exhibited superior average roller weight loss.

B. Adhesive Wear

Figure 1:
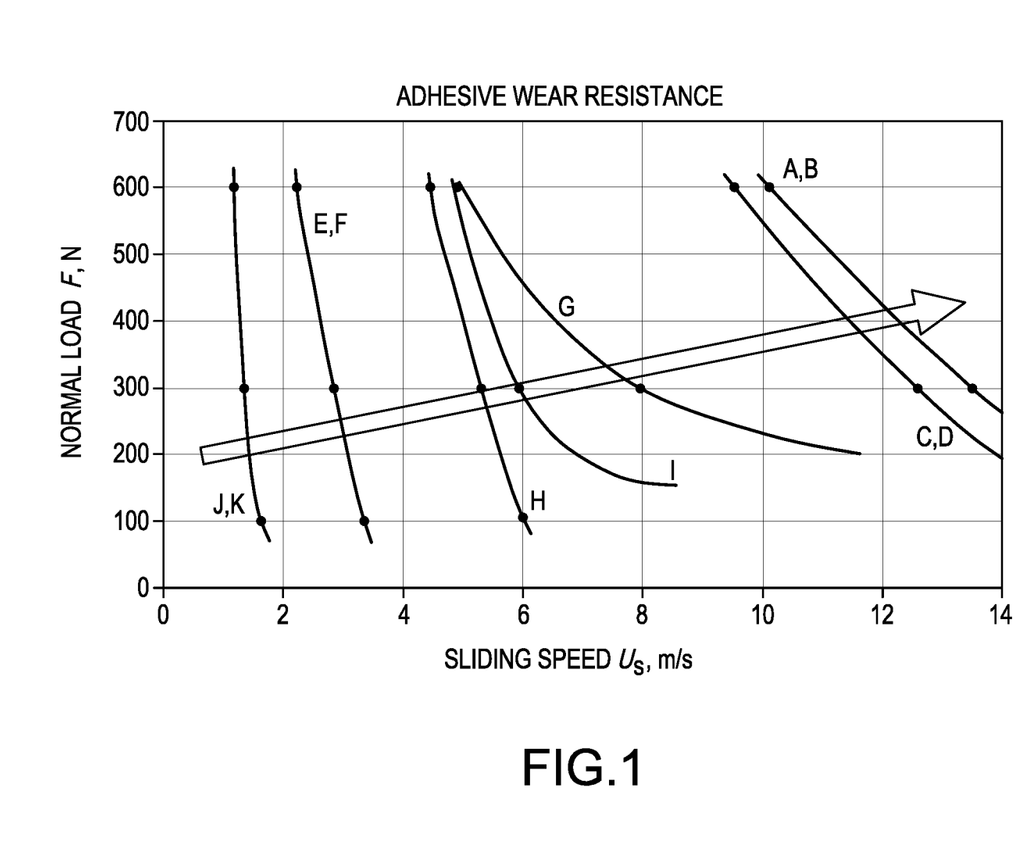
FIG. 1 shows the results of an adhesive wear test performed on materials according to the present teachings and comparative examples.

As shown in FIG. 1, large differences were observed in the various steel alloys with regard to adhesive wear resistance. Although all materials reached the adhesive wear limit when the applied load was 300 or 600 N, some materials (in particular steel alloys A-D) did not exhibit adhesive wear at a load of 100 N.

As can be seen in FIG. 1, steel alloys A-D exhibited notably superior adhesive wear resistance as compared to the other steel alloys.

C. Abrasive Wear

The weight losses of the washer specimens after performing the above-described abrasive wear test are listed in Table 8 below. For ceramic-steel contact, the ceramic balls are harder and more than 100 times rougher than the washer surfaces, thereby indicating that the dominate wear mechanism was abrasive wear.

TABLE 8

| | Ceramic-Steel weight loss in mg | HRC (150 kgf) |
| --- | --- | --- |
| A, B | 5.54 | 61.9 ± 0.2 |
| E, F | 8.48 | 59.0 ± 0.2 |
| G | 7.85 | 63.8 ± 0.3 |
| H | 11.10 | 67.9 ± 0.1 |
| I | 4.65 | 61.4 ± 0.1 |
| J, K | 86.89 | 58.4 ± 0.2 |

Steel Alloys A, B and I exhibited advantageously low abrasive wear results.

To demonstrate differences in microstructure, the nanomechanical properties of samples of Alloy C and Alloy I were measured at nanoscale. The distribution of hardness and elastic modulus was determined from multiple nanoindentation measurements and was then deconvoluted, thereby obtaining an estimate of the microstructural constituents and the corresponding plastic and elastic properties at nanoscale. Alloy C was heat treated as described above in Table 2. Alloy I was heat treated as follows; it was austenitized at 850-860° C. for 15-25 min, then oil-quenched at ca. 50° C. and finally tempered at 200° C. for 4 hours.

More specifically, nanoindentation measurements were obtained by performing nanoindentation using a diamond three-sided Berkovich indenter with a tip radius of approximately 150 nm. An Ultra Nanoindentation Tester (UNHT) from CSM Instruments (now Anton Paar) having a vertical displacement resolution of 0.1 nm and a force resolution of 0.1 μN was employed. Multi-indentations were carried out at a maximum indentation load $L_{max}$ of 7 mN. A total of 1500 indentations were made in each sample across three grids that were respectively placed at three different positions of the sample, each of the three grids having 20×25 indentations spaced apart by a distance of 7 μm.

Nanoindentation hardness ($H_{IT}$) and elastic modulus ($E_{IT}$) are calculated according to the method of Oliver and Pharr (see E. Broitman, "Indentation Hardness Measurements at Macro-, Micro-, and Nanoscale: A Critical Overview," *Tribology Letters*, vol. 65, p. 23, 2017; W. Oliver and G. Pharr, "An improved technique for determining hardness and elastic modulus using load and displacement sensing indentation experiments," *Journal of Materials Research*, vol. 7, no. 6, pp. 1564-1583, 1992) following the standard ISO 14577 Part 4 (more specifically, ISO 14577: Metallic Materials—Instrumented Indentation Test for Hardness and Materials Parameters," International Organization for Standardization, Geneva, 2015).

Deconvolution was carried out by fitting the data with Gaussian curves. The data is considered to belong to a material having non-interacting n phases. Assuming that each phase has a mechanical property x (x=H or E) with a Gaussian distribution, the number of phases n and their Gaussian curve parameters were chosen to minimize the statistical coefficient of determination $R^2$.

Alloy I Steel

Figure 2:
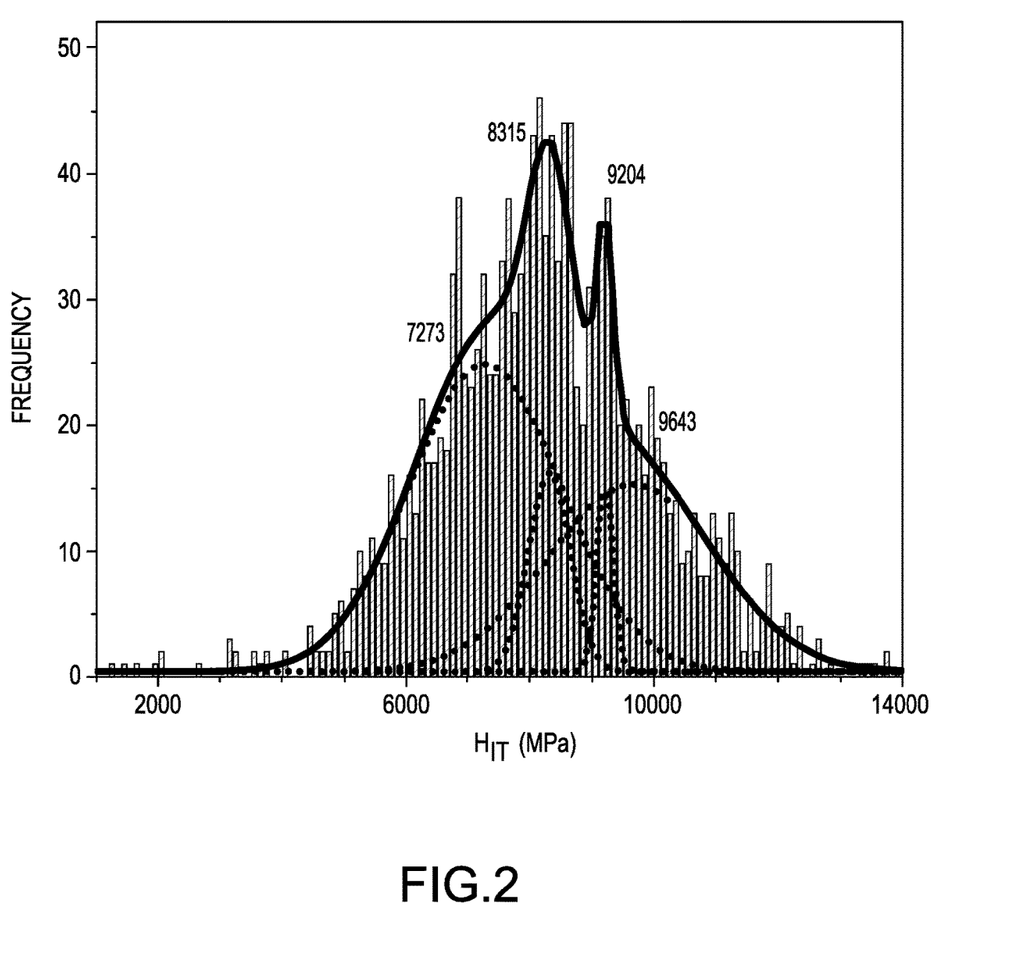
FIG. 2 shows the deconvolution result for the measurement of the nanoindentation hardness $H_{IT}$ of Alloy I (comparative example).

FIG. 2 shows the deconvolution result for the measurement of the nanoindentation hardness $H_{IT}$ of Alloy I, which was obtained at $R^2$=0.935. The presence of four peaks was observed. The position of the apex of each peak, as well as the deviation 6 and the area of each of the four peaks, are respectively shown in Table 9 below.

TABLE 9

| Peak Nr. | $H_{IT}$ (MPa) | σ (MPa) | Area (MPa) |
|---|---|---|---|
| 1 | 7273 | 613 | 74839 (49.3%) |
| 2 | 8316 | 51 | 21226 (14.0%) |
| 3 | 9204 | 26 | 4954 (3.3%) |
| 4 | 9643 | 1194 | 50755 (33.4%) |

Figure 3:
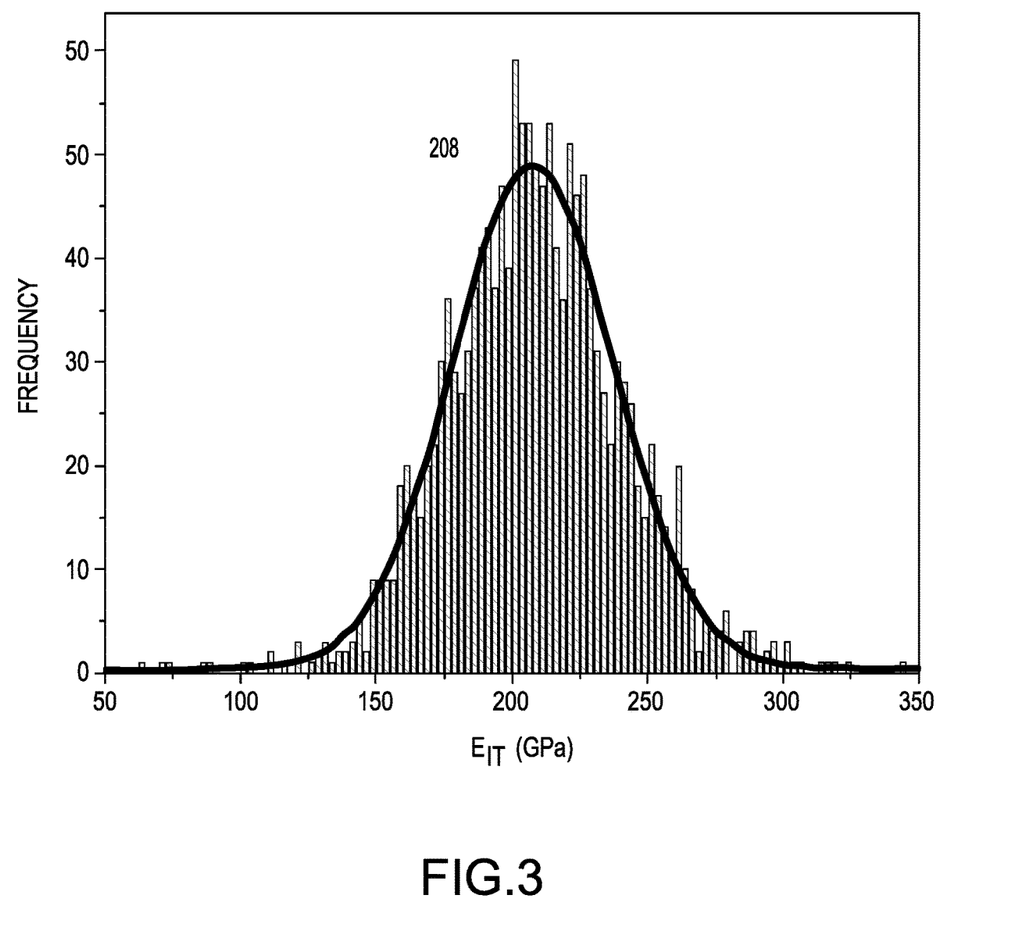
FIG. 3 shows the deconvolution result for the measurement of the nanoindentation elastic modulus of Alloy I.

FIG. 3 shows the deconvolution result for the measurement of the nanoindentation elastic modulus of Alloy I, which obtained at $R^2$=0.963. The presence of only one peak was observed. The position of the apex of the peak, as well as its deviation 6 and the area, are shown in Table 10 below.

TABLE 10

| Peak Nr. | $E_{IT}$ (GPa) | σ (GPa) | Area (GPa) |
|---|---|---|---|
| 1 | 207.70 | 0.61 | 926.3 (100.0%) |

Figure 4:
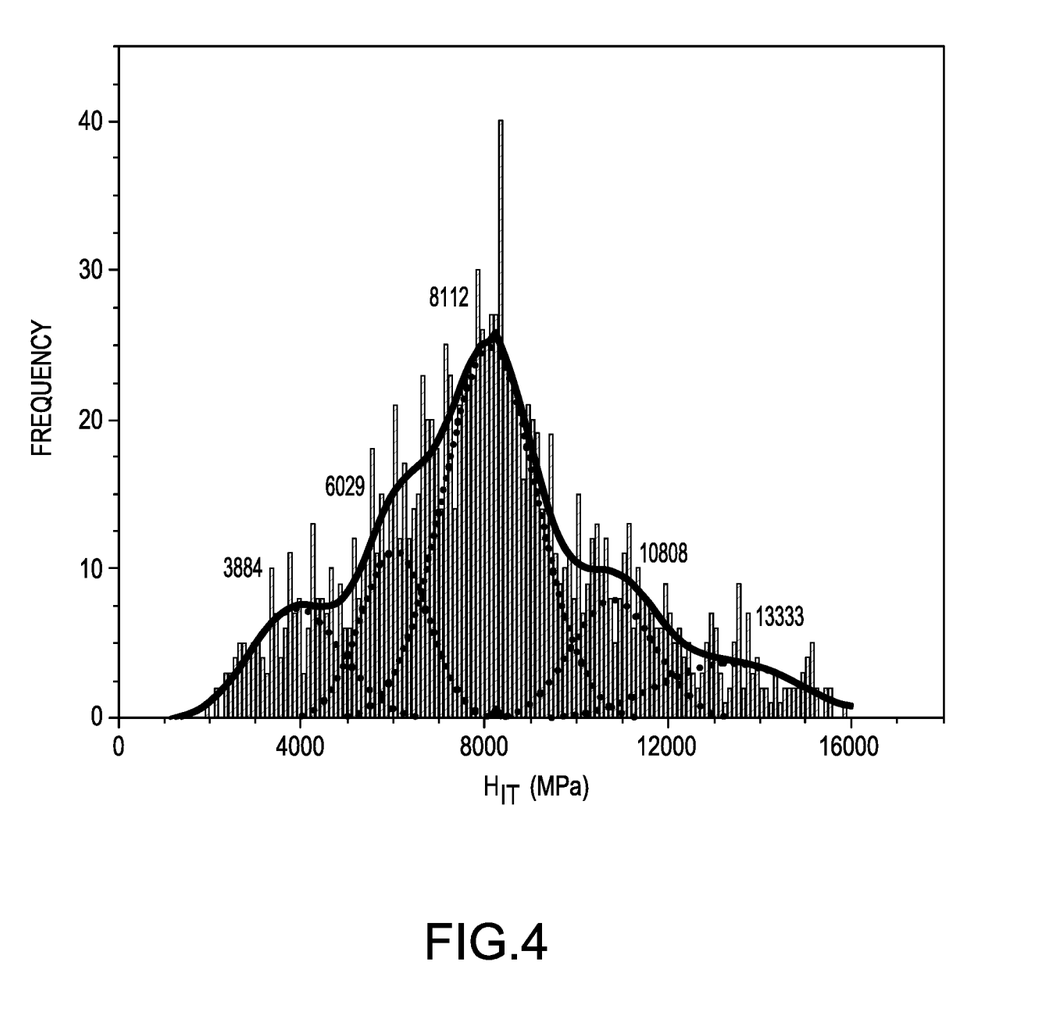
FIG. 4 shows the deconvolution result for the measurement of the nanoindentation hardness $H_{IT}$ of Alloy C (example of the present teachings).

FIG. 4 shows the deconvolution result for the measurement of the nanoindentation hardness $H_{IT}$ of Alloy C, which was obtained at $R^2$=0.909. The presence of five peaks was observed. The position of the apex of each peak, as well as the deviation 6 and the area of each of the five peaks, are shown in Table 11 below.

TABLE 11

| Peak Nr. | $H_{IT}$ (MPa) | σ (MPa) | Area (MPa) |
|---|---|---|---|
| 1 | 3880 | 430 | 18983 (13.4%) |
| 2 | 6030 | 300 | 21226 (15.0%) |
| 3 | 8112 | 166 | 71226 (47.6%) |
| 4 | 10809 | 383 | 18766 (13.2%) |
| 5 | 13333 | 1800 | 15333 (10.8%) |

Figure 5:
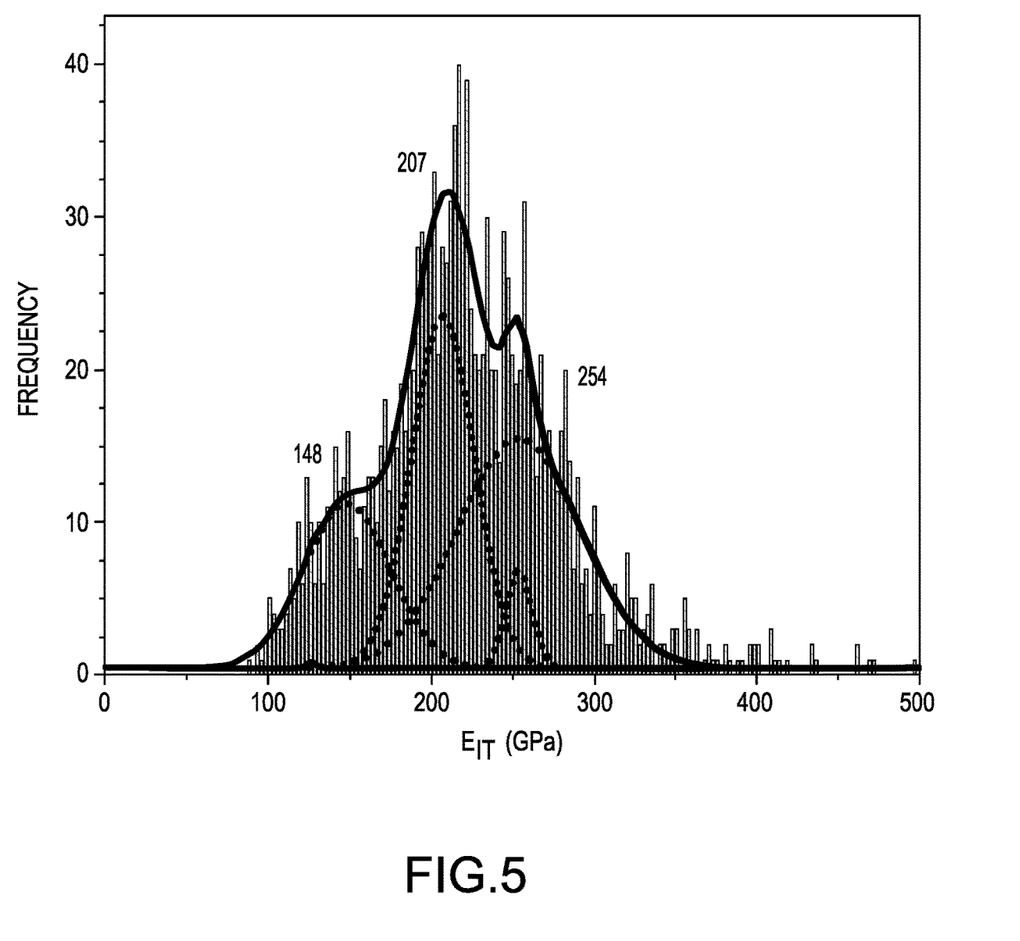
FIG. 5 shows the deconvolution result for the measurement of the nanoindentation elastic modulus of Alloy C.

FIG. 5 shows the deconvolution result for the measurement of the nanoindentation elastic modulus of Alloy C, which was obtained at $R^2$=0.924. The presence of four peaks was observed. The position of the apex of each peak, as well as the deviation 6 and area of the four peaks, are shown in Table 12.

TABLE 12

| Peak Nr. | $E_{IT}$ (GPa) | σ (GPa) | Area (MPa) |
|---|---|---|---|
| 1 | 148.4 | 6.2 | 719.9 (21.1%) |
| 2 | 207.2 | 4.0 | 1121.4 (33.0%) |
| 3 | 254.02 | 2.3 | 127.1 (3.7%) |
| 4 | 254.02 | 32.9 | 1433.3 (42.2%) |

This nanoindentation data was also used to obtain mean nanoscale values for the hardness and elastic modulus of each of Alloys C and I. Table 13 below compares the values measured at macro- and nano-scales. The last ones were obtained by calculating the mean value and dispersion over 1500 measurements. It is noted that there is no direct relationship for hardness measured by Vickers indentation (HV) and by instrumented nanoindentation ($H_{IT}$). According to the above-mentioned ISO 14577, the correlation HV=0.9244 $H_{IT}$ should be used only as a reference.

TABLE 13

| | HV10 (MPa) | HRC (150 kgf) | E (GPa) | $H_{IT}$ (MPa) | $E_{IT}$ (GPa) |
|---|---|---|---|---|---|
| Alloy I | 7280 ± 30 | 61.4 ± 0.1 | 210 | 8275 ± 48 | 208.61 ± 0.86 |
| Alloy C | 7560 ± 20 | 61.0 ± 0.1 | Not determined | 8970 ± 120 | 222.2 ± 1.6 |

With regard to hardness, Alloys C and I exhibited identical macroscopic hardness (61.4±0.1 HRC vs. 61.0±0.1 HRC; the minor difference in measured values was within the experimental error (0.4) of the tester setup and configuration used to measure the hardness), but contained significantly different hardness components as can be seen by comparing FIGS. 2 and 4. In particular, Alloy C (FIG. 4) exhibited peaks at both lower and higher hardness values as compared to Alloy I, in which the peaks were grouped more closely together.

Generally speaking, fatigue life of bearing components is proportional to microscopic hardness. However, Alloy C has a wider range of hardness components (i.e. a larger difference between the lowest and highest hardness peaks). This means that Alloy C has a greater strain hardening capability, which makes it better able to tolerate damage in the matrix and more resistant to surface-initiated fatigue.

With regard to elastic modulus, whereas Alloy I exhibited only one peak having its maximum value at 207.40 GPa (FIG. 3), Alloy C exhibited three significant peaks as can be seen in FIG. 5. In particular, one of the peaks of Alloy C (207.2 GPa) had a similar elastic modulus to the sole peak of Alloy I, but this peak of Alloy C covered only the 33% of the data. The other two other significant peaks of Alloy C, respectively at an elastic modulus of ~254 GPa (46% of the data) and 148 GPa (21% of the data), demonstrate that Alloys C and I have significantly different microstructures.

Additional aspects of the present teachings include, but are not limited to:

1. A bearing component composed of a chromium-molybdenum-vanadium alloyed tool steel produced by a process comprising:
 (i) performing a first preheating within a temperature range of 600-650° C.,
 (ii) performing a second preheating within a temperature range of 850-900° C., (iii) austenitising in vacuum at 1000-1180° C. for 5-60 min, preferably 1080-1150° C. for 20-40 min or 1100-1150° C. for 15-40 min, (iv) gas quenching at a minimum of 4-5 bar overpressure, and (v) tempering by performing either a double temper at 530-560° C. for 1.5-2.5 hours in each temper, preferably 545-560° C. for 1.5-2.5 hours in each temper, or a triple temper at 530-560° C. for 0.5-1.5 hours in each temper, preferably 545-560° C. for 0.75-1.25 hours in each temper. The bearing component is cooled between each temper.

2. The bearing component according to the above Aspect 1 wherein after the tempering steps, the bearing component has a microstructure composed of:
retained austenite 0-1.5 vol. %, more preferably 0-1 vol. %, and/or
cementite 1.0-3.0 vol. %, more preferably 1.8-2.5 vol. %, and/or
Mo2C orthorhombic 0.5-2.5 vol. %, more preferably 1.2-1.6 vol. %, and/or
Iron-alpha (matrix) 80-95 vol. %, more preferably 83-94 vol. %, and/or
VC 3-13 vol. %, more preferably 3.5-12 vol. %.

3. A bearing component composed of a chromium-molybdenum-vanadium alloyed tool steel alloy and having a microstructure composed of:
retained austenite 0-1.5 vol. %, more preferably 0.4-1 vol. %, and/or
cementite 1.0-3.0 vol. %, more preferably 1.8-2.5 vol. %, and/or
Mo2C orthorhombic 0.5-2.5 vol. %, more preferably 1.2-1.6 vol. %, and/or
Iron-alpha (matrix) 80-95 vol. %, more preferably 83-94 vol. %, and/or
VC 3-13 vol. %, more preferably 3.5-12 vol. %.

4. A method for preparing a bearing component composed of a chromium-molybdenum-vanadium alloyed tool steel comprising:

(i) performing a first preheating within a temperature range of 600-650° C., (ii) performing a second preheating within a temperature range of 850-900° C., (iii) austenitising in vacuum at 1080-1185° C. for 5-60 min, preferably 1080-1120° C. for 20-40 min or 1120-1170° C. for 15-40 min, (iv) gas quenching with (at) a minimum of 4-5 bar overpressure, and (v) tempering by performing either a double temper at 530-560° C. for 1.5-2.5 hours in each temper, preferably 545-560° C. for 1.5-2.5 hours in each temper, or a triple temper at 550-570° C. for 0.5-1.5 hours in each temper, preferably 545-560° C. for 0.75-1.25 hours in each temper.

5. The bearing component or method according to any one of the above Aspects 1-4, wherein the bearing component is formed by a powder metallurgy process.

6. The bearing component or method according to any one of the above Aspects 1-4, wherein the bearing component is formed by a spray-forming process.

In Aspect 6, spray-forming, which is also known as spray casting, spray deposition, in-situ compaction or the "Osprey process", may be utilized to form the bearing component and is similar to gas atomization in that the liquid steel is atomized. However, instead of allowing the atomized droplets to solidify during free fall, a rotating collector is inserted in the chamber at a distance from the atomizing nozzle. The sprayed droplets collect and freeze (solidify) on the rotating collector. If the rate of withdrawal of the collector is matched to the rate of the depositing spray, then a spray-formed product, for example a tube from which bearing rings may be fashioned, can be shaped. Essentially, the steel droplets are consolidated already during the product build up stage, and there is no need for further processes such as CIP or HIP.

6.1. The bearing component or method according to any one of the above Aspects 1-4, wherein the bearing component is formed by a 3-D printing process.

7. The bearing component or method according to any preceding Aspect, wherein the steel alloy comprises in mass percent 1.25-1.55 C (carbon) or 2.1-2.5 C, optionally 1.32-1.45 C, optionally 1.3-1.45 C, optionally 2.2-2.4 C.

8. The bearing component or method according to any preceding Aspect, wherein the steel alloy comprises in mass percent 0.28-0.90 Si (silicon), optionally 0.32-0.5, optionally 0.32-0.48 Si, optionally 0.3-0.43 Si, optionally 0.7-0.9 Si.

9. The bearing component or method according to any preceding Aspect, wherein the steel alloy comprises in mass percent 0.22-0.54 Mn (manganese), optionally 0.26-0.48 Mn, optionally 0.3-0.5 Mn.

10. The bearing component or method according to any preceding Aspect, wherein the steel alloy comprises in mass percent 4.0-5.1 Cr (chromium), optionally 4.30-5.10 Cr, optionally 4.60-5.10 Cr, optionally 4.65-4.95 Cr, optionally 4.65-4.85 Cr, optionally 4.85-5.2 Cr.

11. The bearing component or method according to any preceding Aspect, wherein the steel alloy comprises in mass percent 2.80-3.65 Mo (molybdenum) or 3.35-3.85 Mo, optionally 3.35-3.55 Mo, optionally 2.8-3.2 Mo, optionally 3.45-3.75 Mo.

12. The bearing component or method according to any preceding Aspect, wherein the steel alloy comprises in mass percent 3.45-4.0 V (vanadium) or 7.8-8.2 V, optionally 3.55-3.85 V, optionally 3.7-4.0 V, optionally 7.6-8.1 V.

13. The bearing component or method according to any preceding Aspect, wherein the steel alloy optionally contains one or more of 0-0.13 W, 0-0.20 Ni, 0-0.15 Cu, 0-0.8 Co, 0-0.03 P, and/or 0.03 S, preferably one or more of 0-0.1 W, 0-0.18 Ni, 0-0.12 Cu, 0-0.2 Co, 0-0.025 P, and 0-0.028 S.

14. The bearing component or method according to any preceding Aspect, wherein the steel alloy is composed of at least 50 vol. % martensite, preferably at least 60 vol. % martensite, preferably at least 70 vol. % martensite.

15. The bearing component or method according to any preceding Aspect, wherein the bearing component is an inner ring or an outer ring of a rolling element bearing.

16. The bearing component or method according to any preceding Aspect, wherein the steel alloy comprises 1.25-1.55 C (carbon), 0.28-0.90 Si (silicon), 0.22-0.54 Mn (manganese), 4.0-5.10 Cr (chromium), 2.80-3.65 Mo (molybdenum) and 3.45-4.0 V (vanadium), a majority of the matrix being iron.

17. The bearing component or method according to any one of the above Aspects 1-15, wherein the steel alloy is composed (in mass percent) of 1.32-1.45 C, 0.32-0.50 Si, 0.26-0.48 Mn, 4.30-4.85 Cr, 3.35-3.55 Mo and 3.55-3.85 V, optionally containing 0-0.13 W, 0-0.20 Ni, 0-0.15 Cu, 0-0.2 Co, 0-0.3 P, and 0.03 S, the balance being iron and unavoidable impurities.

18. The bearing component or method according to any one of the above Aspects 1-15, wherein the steel alloy is composed (in mass percent) of 1.3-1.45 C, 0.7-0.9 Si, 0.3-0.5 Mn, 4.60-5.2 Cr, 2.8-3.2 Mo and 3.7-4.0 V, optionally containing 0-0.1 W, 0-0.18 Ni, 0-0.12 Cu, 0-0.2 Co, 0-0.025 P, and 0-0.028 S, the balance being iron and unavoidable impurities.

19. The bearing component or method according to any one of the above Aspects 1-15, wherein the steel alloy is composed (in mass percent) of 1.25-1.55 C, 0.28-0.90 Si, 0.22-0.54 Mn, 4.0-5.10 Cr, 2.80-3.65 Mo and 3.45-4.0 V, optionally containing 0-0.1 W, 0-0.18 Ni, 0-0.12 Cu, 0-0.2 Co, 0-0.025 P, the balance being iron and unavoidable impurities.

20. The bearing component or method according to any one of the above Aspects 1-15, wherein the steel alloy is composed (in mass percent) of 1.32-1.45 C, 0.32-0.50 Si, 0.26-0.48 Mn, 4.30-4.85 Cr, 3.35-3.55 Mo and 3.55-3.85 V, optionally containing 0-0.1 W, 0-0.18 Ni, 0-0.12 Cu, 0-0.2 Co, 0-0.025 P, the balance being iron and unavoidable impurities.

21. The bearing component or method according to any one of the above Aspects 1-15, wherein the steel alloy is composed (in mass percent) of 1.3-1.45 C, 0.7-0.9 Si, 0.3-0.5 Mn, 4.60-5.2 Cr, 2.8-3.2 Mo and 3.7-4.0 V, optionally containing 0-0.1 W, 0-0.18 Ni, 0-0.12 Cu, 0-0.2 Co, 0-0.025 P, the balance being iron and unavoidable impurities.

22. The bearing component or method according to any one of the above Aspects 1-15, wherein the steel alloy is composed (in mass percent) of 2.1-2.5 C, 0.3-0.4 Si, 0.3-0.4 Mn, 4.30-5.10 Cr, 3.35-3.85 Mo and 7.6-8.2 V, optionally containing 0-0.1 W, 0-0.12 Cu, 0-0.2 Co, 0-0.025 P, and 0.028 S, the balance being iron and unavoidable impurities.

23. The bearing component or method according to any one of the above Aspects 1-15, wherein the steel alloy is composed (in mass percent) of 2.2-2.4 C, 0.3-0.4 Si, 0.3-0.4 Mn, 4.60-4.95 Cr, 3.45-3.75 Mo and 7.6-8.1 V, optionally containing 0-0.1 W, 0-0.12 Cu, 0-0.2 Co, 0-0.025 P, and 0.028 S, the balance being iron and unavoidable impurities.

24. The bearing component or method according to any preceding Aspect, wherein carbide grains in a cross-section of the microstructure of the bearing component have a number-weighted mean area, as calculated using the ImageJ software publicly available from the United States National Institutes of Health, within a range of 0.1-0.5 $\mu m^2$, preferably 0.15-0.4 $\mu m^2$.

25. The bearing component or method according to any preceding Aspect, wherein 99% of a population of (the) carbide grains in a (the) cross-section of the microstructure of the bearing component have grain areas, as calculated using the ImageJ software publicly available from the United States National Institutes of Health, within a range of 0.0005-2.7 $\mu m^2$, preferably 0.0007-2.7 $\mu m^2$.

26. The bearing component or method according to any preceding Aspect, wherein (the) carbide grains occupy an area of 10-20%, preferably 12-17%, of a total area of the cross-section of the microstructure, as calculated using the ImageJ software publicly available from the United States National Institutes of Health.

27. A bearing component composed of a chromium-molybdenum-vanadium alloyed tool steel produced by a process comprising:
   (i) performing a first preheating within a temperature range of 600-650° C.,
   (ii) performing a second preheating within a temperature range of 850-900° C.,
   (iii) austenitizing in vacuum at 1000-1180° C. for 5-60 min,
   (iv) gas quenching at a minimum of 4-5 bar overpressure, and
   (v) tempering by performing either a double temper at 520-560° C. for 1.5-2.5 hours in each temper, or a triple temper at 520-560° C. for 0.5-1.5 hours in each temper.

28. The bearing component according to the above Aspect 27, wherein after the tempering steps, the bearing component has a microstructure composed of:
   retained austenite 0-1.5 vol. %,
   cementite 1.0-3.0 vol. %,
   Mo2C orthorhombic 0.5-2.5 vol. %,
   Iron-alpha (matrix) 80-95 vol. %, and
   VC 3-13 vol. %.

29. The bearing component according to the above Aspect 27 or 28, wherein: the austenitizing step is performed at 1080-1150° C. for 20-40 min, and the double temper is performed at 540-560° C. for 1.5-2.5 hours in each temper, or the triple temper is performed at 540-560° C. for 0.75-1.25 hours in each temper.

30. The bearing component according to the any one of the above Aspects 27-29, wherein after the tempering steps, the bearing component has a microstructure composed of:
   retained austenite 0-1 vol. %,
   cementite 1.8-2.5 vol. %,
   Mo2C orthorhombic 1.2-1.6 vol. %,
   Iron-alpha (matrix) 83-94 vol. %, and
   VC 3.5-12 vol. %.

31. The bearing component according to any one of the above Aspects 27-30, wherein the steel alloy is composed of at least 60 vol. % martensite.

32. The bearing component according to any one of the above Aspects 27-31, wherein the bearing component is formed by a powder metallurgy process.

33. The bearing component according to any one of the above Aspects 27-32, wherein the steel alloy comprises in mass percent 1.5-2.5 W.

34. The bearing component according to any one of the above Aspects 27-33, wherein the steel alloy comprises in mass percent 1.25-1.55 C.

35. The bearing component according to any one of the above Aspects 27-34, wherein the steel alloy comprises in mass percent 0.28-0.90 Si.

36. The bearing component according to any one of the above Aspects 27-35, wherein the steel alloy comprises in mass percent 0.22-0.54 Mn.

37. The bearing component according to any one of the above Aspects 27-36, wherein the steel alloy comprises in mass percent 4.0-5.10 Cr.

38. The bearing component according to any one of the above Aspects 27-37, wherein the steel alloy comprises in mass percent 2.80-3.65 Mo.

39. The bearing component according to any one of the above Aspects 27-38, wherein the steel alloy comprises in mass percent 3.45-4.0 V.

40. The bearing component according to any one of the above Aspects 27-39, wherein the bearing component is an inner ring or an outer ring of a rolling element bearing.

41. The bearing component according to the above Aspect 40, wherein the steel alloy comprises 1.25-1.55 C, 0.28-0.90 Si, 0.22-0.54 Mn, 4.0-5.10 Cr, 2.80-3.65 Mo and 3.45-4.0 V, a majority of the matrix being iron.

42. The bearing component according to the above Aspect 40, wherein after the tempering steps, the bearing component has a microstructure composed of:
   retained austenite 0-1 vol. %,
   cementite 1.8-2.5 vol. %,
   Mo2C orthorhombic 1.2-1.6 vol. %,
   Iron-alpha (matrix) 83-94 vol. %, and
   VC 3.5-12 vol. %; and wherein the steel alloy is composed of at least 60 vol. % martensite.

43. The bearing component according to the above Aspect 42, wherein the steel alloy is composed (in mass percent) of 1.32-1.45 C, 0.32-0.50 Si, 0.26-0.48 Mn, 4.30-4.85 Cr, 3.35-3.55 Mo, 3.55-3.85 V, 0-0.13 W, 0-0.20 Ni, 0-0.15 Cu, 0-0.8 Co, 0-0.03 P, and 0.03 S, the balance being iron and unavoidable impurities.

44. The bearing component according to the above Aspect 43, wherein the steel alloy is composed (in mass percent) of 1.4 C, 0.4 Si, 0.4 Mn, 4.7 Cr, 3.5 M and 3.7 V, 0-0.1 W, 0-0.18 Ni, 0-0.12 Cu, 0-0.2 Co, 0-0.025 P, and 0.028 S, the balance being iron and unavoidable impurities 45. A bearing component composed of a chromium-molybdenum-vanadium alloyed tool steel alloy and having a microstructure composed of:
retained austenite 0-1.5 vol. %,
cementite 1.0-3.0 vol. %,
Mo2C orthorhombic 0.5-2.5 vol. %,
Iron-alpha (matrix) 80-95 vol. %, and
VC 3-13 vol. %, more preferably 3.5-12 vol. %.

46. A method for preparing a bearing component composed of a chromium-molybdenum-vanadium alloyed tool steel comprising:
(i) performing a first preheating within a temperature range of 600-650° C.,
(ii) performing a second preheating within a temperature range of 850-900° C.,
(iii) austenitizing in vacuum at 1000-1180° C. for 5-60 min,
(iv) gas quenching at a minimum of 4-5 bar overpressure, and
(v) tempering by performing either a double temper at 520-560° C. for 1.5-2.5 hours in each temper, or a triple temper at 520-560° C. for 0.5-1.5 hours in each temper.

47. The method according to the above Aspect 46, wherein: the austenitizing step is performed at 1100-1150° C. for 20-40 min, and the double temper is performed at 540-560° C. for 1.5-2.5 hours in each temper, or the triple temper is performed at 540-560° C. for 0.75-1.25 hours in each temper.

48. A bearing component composed of a chromium-molybdenum-vanadium alloyed tool steel produced by a process comprising:
(i) performing a first preheating within a temperature range of 600-650° C.,
(ii) performing a second preheating within a temperature range of 850-900° C.,
(iii) austenitizing in vacuum at 1000-1180° C. for 5-60 min,
(iv) gas quenching at a minimum of 4-5 bar overpressure, and
(v) tempering by performing either a double temper at 520-560° C. for 1.5-2.5 hours in each temper, or a triple temper at 520-560° C. for 0.5-1.5 hours in each temper.

49. The bearing component according to the above Aspect 48, wherein after the tempering steps, the bearing component has a microstructure composed of:
retained austenite 0-1.5 vol. %,
cementite 1.0-3.0 vol. %,
Mo2C orthorhombic 0.5-2.5 vol. %,
Iron-alpha (matrix) 80-95 vol. %, and
VC 3-13 vol. %.

50. The bearing component according to the above Aspect 48 or 49, wherein:
the austenitizing step is performed at 1080-1150° C. for 20-40 min, and the double temper is performed at 540-560° C. for 1.5-2.5 hours in each temper, or the triple temper is performed at 540-560° C. for 0.75-1.25 hours in each temper.

51. The bearing component according to any one of the above Aspects 48-50, wherein after the tempering step(s), the bearing component has a microstructure composed of:
retained austenite 0-1 vol. %,
cementite 1.8-2.5 vol. %,
Mo2C orthorhombic 1.2-1.6 vol. %,
Iron-alpha (matrix) 83-94 vol. %, and
VC 3.5-12 vol. %.

52. The bearing component according to any one of the above Aspects 48-51, wherein the steel alloy is composed of at least 60 vol. % martensite.

53. The bearing component according to any one of the above Aspects 48-52, wherein the steel alloy comprises in mass percent 1.25-1.55 C.

54. The bearing component according to any one of the above Aspects 48-53, wherein the steel alloy comprises in mass percent 0.28-0.90 Si.

55. The bearing component according to any one of the above Aspects 48-54, wherein the steel alloy comprises in mass percent 1.5-3.5 W.

56. The bearing component according to any one of the above Aspects 48-55, wherein the bearing component is an inner ring or an outer ring of a rolling element bearing.

57. A method for preparing a bearing component composed of a chromium-molybdenum-vanadium alloyed tool steel comprising:
(i) performing a first preheating within a temperature range of 600-650° C.,
(ii) performing a second preheating within a temperature range of 850-900° C.,
(iii) austenitizing in vacuum at 1000-1180° C. for 5-60 min,
(iv) gas quenching at a minimum of 4-5 bar overpressure, and
(v) tempering by performing either a double temper at 520-560° C. for 1.5-2.5 hours in each temper, or a triple temper at 520-560° C. for 0.5-1.5 hours in each temper.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved heat-treated steel alloys, e.g., for use in bearing applications, such as (without limitation) super-precision bearing applications.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the above-described Aspects and the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments, aspects and/or the claims. In addition, all value ranges or indications of groups of entities are intended to disclose every possible intermediate value or intermediate entity for the purpose of original written disclosure, as well as for the purpose of restricting the claimed subject matter.

We claim:

1. A method for preparing a bearing component composed of a chromium-molybdenum-vanadium alloyed tool steel comprising:
   (i) performing a first preheating of the bearing component within a temperature range of 600-650° C.,
   (ii) performing a second preheating of the bearing component within a temperature range of 850-900° C.,
   (ii) austenitizing the bearing component in vacuum at 1000-1180° C. for 5-60 min,
   (iv) gas quenching the bearing component at a minimum of 4 bar overpressure, and
   (v) tempering the bearing component by performing either a double temper at 520-560° C. for 1.5-2.5 hours in each temper, or a triple temper at 520-560° C. for 0.5-1.5 hours in each temper,
   wherein:
   the bearing component is an inner ring or an outer ring of a rolling element bearing,
   the bearing component comprises 1.25-1.55 mass % C, 0.28-0.90 mass % Si, 0.22-0.54 mass % Mn, 4.0-5.10 mass % Cr, 2.80-3.65 mass % Mo and 3.45-4.0 mass % V, and at least 50 mass % of the bearing component is iron.

2. The method according to claim 1, wherein the bearing component comprises 1.32-1.42 mass % C.

3. The method according to claim 1, wherein the bearing component comprises 0.32-0.43 mass % Si.

4. The method according to claim 1, wherein the bearing component comprises 0.26-0.48 mass % Mn.

5. The method according to claim 1, wherein the bearing component comprises 4.30-4.85 mass % Cr.

6. The method according to claim 1, wherein the bearing component comprises 3.35-3.65 mass % Mo.

7. The method according to claim 1, wherein the bearing component comprises 3.45-3.9 mass % V.

8. The method according to claim 1, wherein after the tempering, the bearing component has a microstructure composed of:
   retained austenite 0-1 vol. %,
   cementite 1.8-2.5 vol. %,
   Mo2C orthorhombic 1.2-1.6 vol. %,
   Iron-alpha (matrix) 83-94 vol. %, and
   VC 3.5-12 vol. %; and
   wherein the steel alloy is composed of at least 60 vol. % martensite.

9. The method according to claim 8, wherein the bearing component is composed of 1.32-1.45 mass % C, 0.32-0.50 mass % Si, 0.26-0.48 mass % Mn, 4.30-4.85 mass % Cr, 3.35-3.55 mass % Mo, 3.55-3.85 mass % V, 0-0.13 mass % W, 0-0.20 mass % Ni, 0-0.15 mass % Cu, 0-0.8 mass % Co, 0-0.03 mass % P, and 0-0.03 mass % S, the balance being iron and unavoidable impurities.

10. The method according to claim 8, wherein the bearing component is composed of 1.4 mass % C, 0.4 mass % Si, 0.4 mass % Mn, 4.7 mass % Cr, 3.5 mass % Mo, 3.7 mass % V, 0-0.1 mass % W, 0-0.18 mass % Ni, 0-0.12 mass % Cu, 0-0.2 mass % Co, 0-0.025 mass % P, and 0-0.028 mass % S, the balance being iron and unavoidable impurities.

11. The method according to claim 9, wherein:
   the austenitizing step is performed at 1100-1150° C. for 20-40 min, and
   the double temper is performed at 540-560° C. for 1.5-2.5 hours in each temper, or the triple temper is performed at 540-560° C. for 0.75-1.25 hours in each temper.

12. A method for preparing a bearing component composed of a chromium-molybdenum-vanadium alloyed tool steel comprising:
   (i) performing a first preheating of the bearing component within a temperature range of 600-650° C.,
   (ii) performing a second preheating of the bearing component within a temperature range of 850-900° C.,
   (iii) austenitizing the bearing component in vacuum at 1000-1180° C. for 5-60 min,
   (iv) gas quenching the bearing component at 4-5 bar overpressure, and
   (v) tempering the bearing component by performing either a double temper at 520-560° C. for 1.5-2.5 hours in each temper, or a triple temper at 520-560° C. for 0.5-1.5 hours in each temper;
   wherein:
   the bearing component has a composition selected from the group consisting of:
      (i) a first steel alloy comprising 1.25-1.55 mass % C, 0.28-0.90 mass % Si, 0.22-0.54 mass % Mn, 4.0-5.10 mass % Cr, 2.80-3.65 mass % Mo and 3.45-4.0 mass % V, and
      (ii) a second steel alloy comprising 2.1-2.5 mass % C, 0.3-0.5 mass % Si, 0.3-0.4 mass % Mn, 4.55-5.10 mass % Cr, 3.35-3.85 mass % Mo and 7.6-8.2 mass % V, and
   at least 50 mass % of the composition of the bearing component is iron.

13. The method according to claim 12, wherein after the tempering, the bearing component has a microstructure composed of:
   retained austenite 0-1.5 vol. %,
   cementite 1.0-3.0 vol. %,
   Mo2C orthorhombic 0.5-2.5 vol. %,
   Iron-alpha (matrix) 80-95 vol. %, and
   VC 3-13 vol. %.

14. The method according to claim 13, wherein:
   the austenitizing step is performed at 1080-1150° C. for 20-40 min, and
   the double temper is performed at 540-560° C. for 1.5-2.5 hours in each temper, or the triple temper is performed at 540-560° C. for 0.75-1.25 hours in each temper.

15. The method according to claim 14, wherein after the tempering, the bearing component has a microstructure composed of:
   retained austenite 0-1 vol. %,
   cementite 1.8-2.5 vol. %,
   Mo2C orthorhombic 1.2-1.6 vol. %,
   Iron-alpha (matrix) 83-94 vol. %, and
   VC 3.5-12 vol. %.

16. The method according to claim 12, wherein after the tempering, the bearing component is composed of at least 60 vol. % martensite.

17. The method according to claim 12, further comprising, prior to step (i), forming the bearing component by a powder metallurgy process.

18. The method according to claim 12, wherein the bearing component is an inner ring or an outer ring of a rolling element bearing.

19. The method according to claim 12, wherein:
   the austenitizing step is performed at 1100-1150° C. for 20-40 min, and the double temper is performed at 540-560° C. for 1.5-2.5 hours in each temper, or the triple temper is performed at 540-560° C. for 0.75-1.25 hours in each temper.

20. The method according to claim 12, wherein the second steel alloy consists of 2.2-2.4 mass % C, 0.32-0.48 mass % Si, 0.30-0.40 mass % Mn, 4.60-4.95 mass % Cr, 3.45-3.75 mass % Mo, 7.6-8.20 mass % V, 0-0.13 mass % W, 0-0.20 mass % Ni, 0-0.15 mass % Cu, 0-0.8 mass % Co, 0-0.03 mass % P, and 0-0.03 mass % S, the balance being iron and up to 0.5 mass % unavoidable impurities.

* * * * *